United States Patent
Hsieh

(10) Patent No.: US 9,034,203 B2
(45) Date of Patent: May 19, 2015

(54) LIQUID CRYSTAL MOLECULE HAVING FIVE-MEMBERED RING STRUCTURE AND MIXTURE FOR THE SAME

(75) Inventor: Chung-Ching Hsieh, Shenzhen (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 290 days.

(21) Appl. No.: 13/640,314

(22) PCT Filed: Jul. 2, 2012

(86) PCT No.: PCT/CN2012/078024
§ 371 (c)(1),
(2), (4) Date: Oct. 9, 2012

(87) PCT Pub. No.: WO2013/189098
PCT Pub. Date: Dec. 27, 2013

(65) Prior Publication Data
US 2013/0337196 A1 Dec. 19, 2013

(51) Int. Cl.
| | | |
|---|---|---|
| C09K 19/34 | (2006.01) | |
| C09K 19/56 | (2006.01) | |
| C07C 43/02 | (2006.01) | |
| C07C 19/08 | (2006.01) | |
| C09K 19/06 | (2006.01) | |
| C09K 19/30 | (2006.01) | |
| C09K 19/04 | (2006.01) | |
| C09K 19/12 | (2006.01) | |

(52) U.S. Cl.
CPC .............. *C09K 19/063* (2013.01); *C09K 19/062* (2013.01); *C09K 19/30* (2013.01); *C09K 2019/0448* (2013.01); *C09K 2019/122* (2013.01)

(58) Field of Classification Search
CPC ........... C09K 19/30; C09K 2019/0448; C09K 2019/122
USPC ............... 252/299.01, 299.6, 299.61, 299.63, 252/299.66; 428/1.1; 570/129, 182; 568/642, 643, 645, 647
See application file for complete search history.

(56) References Cited

U.S. PATENT DOCUMENTS 6,696,110 B1 * 2/2004 Tuffin et al. .................... 428/1.1

* cited by examiner

*Primary Examiner* — Geraldina Visconti

(57) ABSTRACT

The present invention discloses a liquid crystal (LC) molecule having a five-membered ring structure and a mixture thereof. A traditional LC molecule is modified into the LC molecule having the five-membered ring structure. The rotational viscosity of the LC molecule within an LC panel is decreased by properties of the five-membered ring structure, so that the LC molecule having the five-membered ring structure has a fast off-time than that of the traditional LC molecule. The present invention can decrease the rotational viscosity of the LC molecule within the LC panel by modification of the five-membered ring structure of the LC molecule, and thus the problem of cross-talk effect produced from switching a two-dimensional mode to a three-dimensional mode in an LC display can be improved.

13 Claims, 1 Drawing Sheet

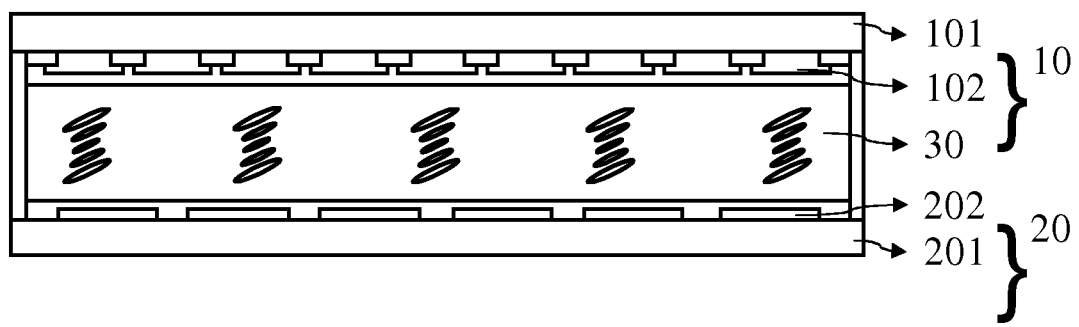

LIQUID CRYSTAL MOLECULE HAVING FIVE-MEMBERED RING STRUCTURE AND MIXTURE FOR THE SAME

BACKGROUND OF THE INVENTION

1. Field of the Invention

The present invention relates to a liquid crystal (LC) layer for an LC panel, and more specifically to an LC molecule having a five-membered ring structure and a mixture thereof that can improve cross-talk effect produced from switching a two-dimensional (2D) mode to a three-dimensional (3D) mode.

2. Description of the Prior Art

In recent years, continuous advancement of display technologies results in increasing demands on display quality of displays, such as image resolution, color saturation, and so on. Nevertheless, in process of purchasing a display, whether the display is able to display 3D images or not is also taken into consideration in addition to high image resolution and high color saturation.

In current 3D image display technologies, a fixed barrier is mainly utilized for controlling images captured in respective eyes of a viewer. However, according to visual characteristics of human eyes, a 3D image may be produced when two images with the same content but different parallax are respectively captured by a viewer's left and right eyes.

However, after switching a 2D image to the 3D image in the display, since LC materials within the display have high viscosity, the display has long off-time, and therefore leads to a cross-talk effect in a screen of the display. An LC layer generally includes the LC materials formed by rod-like LC molecules having a formula (V) or (VI) as follows:

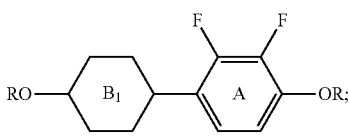

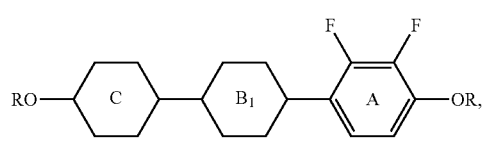

and in the formula (V) or (VI), A represents benzene of an aromatic ring; C represents cyclohexane of an alicyclic ring; $B_1$ represents cyclohexane or benzene; RO— represents a terminal group, and RO— is an alkoxy group; and F represents a lateral group, and F here is a fluorine atom.

Therefore, there is a need to provide the LC molecule which can improve the problem of cross-talk effect, so as to overcome the disadvantage in the prior art.

SUMMARY OF THE INVENTION

An object of the present invention is to provide a liquid crystal (LC) molecule which can improve cross-talk effect. A traditional LC molecule is modified into the LC molecule having the five-membered ring structure. The rotational viscosity of the LC molecule is decreased by properties of the five-membered ring structure, thereby decreasing off-time. The present invention is capable of improving the problem of cross-talk effect produced from switching a two-dimensional (2D) mode to a three-dimensional (3D) mode in an LC display.

To achieve the above object, the present invention provides an LC molecule having the five-membered ring structure for forming an LC layer of an LC panel, in which the LC molecule is shown as a formula (I):

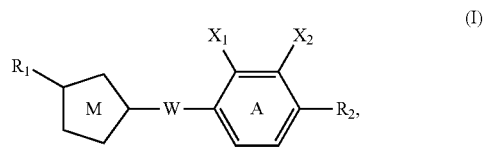

and in the formula (I), A represents benzene; M represents a five-membered ring structure; $R_1$ and $R_2$ are respectively alkyl group of 1 to 8 carbon atoms, alkenyl group of 2 to 8 carbon atoms, or alkoxy group of 1 to 7 carbon atoms; $X_1$ and $X_2$ are respectively a fluorine atom or a chlorine atom; and W represents one linking group selected from the group consisting of —$CH_2CH_2$—, —$OCF_2$—, —$CF_2O$—, —$CF_2CF_2$—, and —CH=CH—.

In one exemplary embodiment of the present invention, the LC layer further includes liquid crystal reactive monomers (LC RMs) having a formula (III) below, such that the LC molecule having the formula (I) and the LC RMs having the formula (III) form an LC composition, and the LC RMs are used to distribute the LC composition onto a polyimide surface of an alignment film:

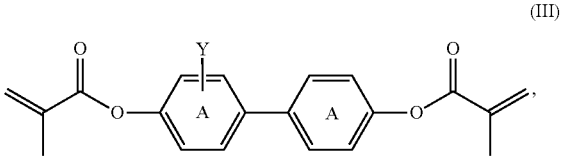

and in the formula (III), A represents benzene; O represents an oxygen atom; and Y represents a hydrogen atom or a fluorine atom, and the LC molecule having the formula (I) has a weight ratio between 0.01% and 60% based on the total weight of the LC composition, and the remaining is the LC RMs having the formula (III).

In one exemplary embodiment of the present invention, and it further includes the LC molecule having a formula (IV) below:

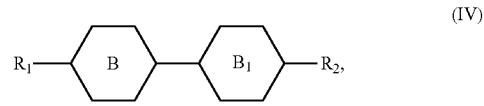

and in the formula (IV), B represents cyclohexane; $B_1$ represents cyclohexane or benzene; and $R_1$ and $R_2$ are respectively alkyl group of 1 to 8 carbon atoms, alkenyl group of 2 to 8 carbon atoms, or alkoxy group of 1 to 7 carbon atoms.

In one exemplary embodiment of the present invention, the LC molecule having the five-membered ring structure is applied to the LC panel having a 2D mode and a 3D mode.

The present invention also provides an LC molecule having a five-membered ring structure for forming an LC layer of an LC panel, in which the LC molecule is shown as a formula (II):

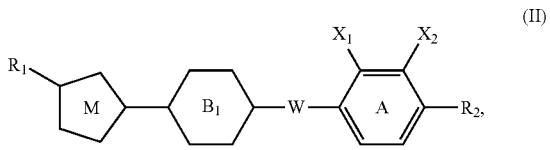

(II)

and in the formula (II), A represents benzene; $B_1$ represents cyclohexane or benzene;

M represents a five-membered ring structure; $R_1$ and $R_2$ are respectively alkyl group of 1 to 8 carbon atoms, alkenyl group of 2 to 8 carbon atoms, or alkoxy group of 1 to 7 carbon atoms; $X_1$ and $X_2$ are respectively a fluorine atom or a chlorine atom; and W represents one linking group selected from the group consisting of —$CH_2CH_2$—, —$OCF_2$—, —$CF_2O$—, —$CF_2CF_2$—, and —CH=CH—.

In one exemplary embodiment of the present invention, the LC layer further includes LC RMs having a formula (III) below, such that the LC molecule having the formula (II) and the LC RMs having the formula (III) form an LC composition, and the LC RMs are used to distribute the LC composition onto a polyimide surface of an alignment film:

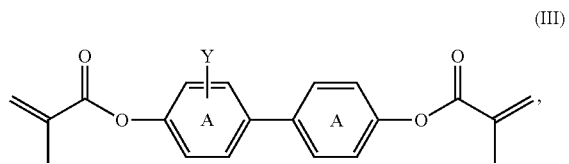

(III)

and in the formula (III), A represents benzene; O represents an oxygen atom; and Y represents a hydrogen atom or a fluorine atom, and the LC molecule having the formula (II) has a weight ratio between 0.01% and 60% based on the total weight of the LC composition, and the remaining is the LC RMs having the formula (III).

In one exemplary embodiment of the present invention, and it further includes the LC molecule having a formula (I) below, the LC molecule having the formula (I) and the LC molecule having the formula (II) form a mixture of LC molecules having a five-membered ring structure:

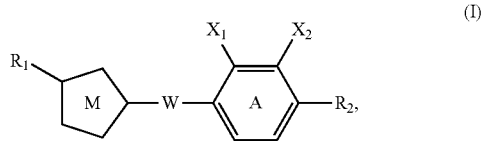

(I)

and in the formula (I), A represents benzene; M represents a five-membered ring structure; $R_1$ and $R_2$ are respectively alkyl group of 1 to 8 carbon atoms, alkenyl group of 2 to 8 carbon atoms, or alkoxy group of 1 to 7 carbon atoms; $X_1$ and $X_2$ are respectively a fluorine atom or a chlorine atom; and W represents one linking group selected from the group consisting of —$CH_2CH_2$—, —$OCF_2$—, —$CF_2O$—, —$CF_2CF_2$—, and —CH=CH—.

In one exemplary embodiment of the present invention, and it further includes the LC molecule having a formula (IV) below:

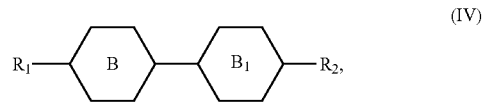

(IV)

and in the formula (IV), B represents cyclohexane; $B_1$ represents cyclohexane or benzene; and $R_1$ and $R_2$ are respectively alkyl group of 1 to 8 carbon atoms, alkenyl group of 2 to 8 carbon atoms, or alkoxy group of 1 to 7 carbon atoms.

In one exemplary embodiment of the present invention, the LC molecule having the five-membered ring structure is applied to the LC panel having a 2D mode and a 3D mode.

The present invention has obvious advantages and beneficial effects than the prior art. The LC molecule having the five-membered ring structure and the mixture of the present invention has at least the following advantages and beneficial effects by the above technical solution: The LC molecule having the five-membered ring structure and the mixture of the present invention is modified from the traditional LC molecule. The rotational viscosity of the LC molecule within the LC panel is decreased by properties of the five-membered ring structure, so that the LC molecule having the five-membered ring structure has a fast off-time than that of the traditional LC molecule, and thus the problem of cross-talk effect produced from switching the 2D mode to the 3D mode in the LC display is improved.

BRIEF DESCRIPTION OF THE DRAWINGS

FIG. 1 is a schematic view of a structure of a liquid crystal panel having a two-dimensional mode and a three-dimensional mode according to an embodiment of the present invention.

DETAILED DESCRIPTION OF THE PREFERRED EMBODIMENTS

Various preferred embodiments are now described with reference to the accompanying drawings. In the following description, for purposes of explanation, numerous specific details are set forth in order to provide a thorough understanding of a liquid crystal (LC) molecule having a five-membered ring structure and a mixture thereof, and its specific embodiment, structure, feature and functions.

Please refer to FIG. 1. FIG. 1 is a schematic view of a structure of an LC panel having a two-dimensional (2D) mode and a three-dimensional (3D) mode according to an embodiment of the present invention. The LC panel includes a first substrate 10, a second substrate 20, and an LC layer 30. The first substrate 10 and the second substrate 20 are correspondingly arranged, and the LC layer 30 is sandwiched between the first substrate 10 and the second substrate 20. The first substrate 10 can be a color filter substrate, which includes a first transparent substrate 101 and a color filter layer 102. The color filter layer 102 is disposed on an inner surface of the first transparent substrate 101. The second substrate 20 can be a thin film transistor (TFT) array substrate, which includes a second transparent substrate 201 and a TFT array layer 202. The TFT array layer 202 is disposed on an inner surface of the second transparent substrate 201. LC molecules of the LC layer 30 are the LC molecules having a five-membered ring structure.

The LC molecules having the five-membered ring structure of the LC layer 30 of the present invention will now be discussed in further detail. The LC molecules having the five-membered ring structure of the present invention are to employ rod-like LC molecules of the prior art as a modifying object, e.g., refer to formulas (V) and (VI) in the above-mentioned background of the invention. The rod-like LC molecules are polymers containing an aromatic ring and an alicyclic ring on a straight chain thereof. The inventors of the present invention have done intensive studies to solve the subject as mentioned in the description of the background, and the rod-like LC molecules are modified by an introduction of the five-membered ring in a molecular chain of the rod-like LC molecules. In other words, the aromatic ring or the alicyclic ring which has a terminal group and has no a lateral group is replaced by the five-membered ring structure on the straight chain of the rod-like LC molecules, and forming the LC molecule having the five-membered ring structure. If the LC molecules having the formulas (V) and (VI) are employed as the modifying object, the modified LC molecules are respectively shown as formulas (I) and (II). Thus, the five-membered ring structure also has properties of the five-membered ring structure on the molecular chain of the LC molecules having the five-membered ring structure. The LC molecule having the five-membered ring structure according to the formula (I) or (II) is filled in the substrate, and as the LC layer 30 thereof, thereby forming the LC panel having the 2D mode and the 3D mode. The rotational viscosity of the LC molecule within the LC panel is decreased by properties of the five-membered ring structure, so that the LC molecule having the five-membered ring structure has a fast off-time than the rod-like LC molecule. Thus, the problem of cross-talk effect produced from switching the 2D mode to the 3D mode in an LC display can be improved. The off-time ($T_{off}$) is related to the rotational viscosity ($\gamma_1$), a cell gap (d) and off-time constant ($K_{off}$), as shown in an off-time equation according to a formula (VII).

$$T_{off} \propto \frac{\gamma_1 d^2}{K_{off}}. \tag{VII}$$

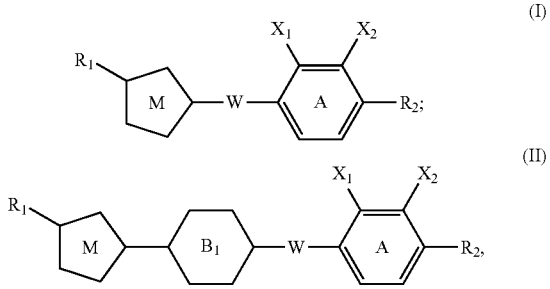

and in the formulas (I) and (II), A represents benzene; $B_1$ represents cyclohexane or benzene; M represents a five-membered ring structure; $R_1$ and $R_2$ are respectively alkyl group of 1 to 8 carbon atoms, alkenyl group of 2 to 8 carbon atoms, or alkoxy group of 1 to 7 carbon atoms; $X_1$ and $X_2$ are respectively a fluorine atom or a chlorine atom; and W represents one linking group selected from the group consisting of —$CH_2CH_2$—, —$OCF_2$—, —$CF_2O$—, —$CF_2CF_2$—, and —CH=CH—.

In addition to the LC molecules having the five-membered ring structure, the LC layer 30 of the present invention further includes liquid crystal reactive monomers (LC RMs) having a formula (III) below. The LC molecules having the five-membered ring structure and the LC RMs having the formula (III) form an LC composition. The LC RMs are used to distribute the LC composition onto a polyimide surface of an alignment film, the LC RMs having the formula (III) are shown as following:

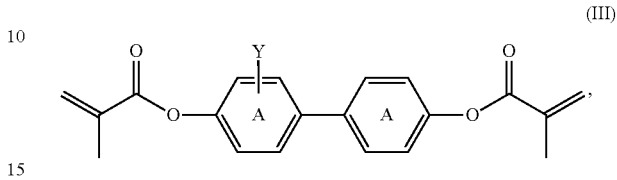

and in the formula (III), A represents benzene; O represents an oxygen atom; and Y represents a hydrogen atom or a fluorine atom, and the LC molecule having the formula (I) or (II) has a weight ratio between 0.01% and 60% (e.g., 0.01%, 1%, 2%, 5%, 10%, 15%, 20%, 30%, 40%, 50%, or 60%, etc.) based on the total weight of the LC composition, and the remaining is the LC RMs having the formula (III). A weight ratio of the LC molecule having the formula (I) or (II) preferably is greater than a weight ratio of the LC RMs having the formula (III).

According to the LC molecules in the LC layer 30, the LC molecule having a formula (I), (II), (V) or (VI) can be freely mixed to be used as LC materials within the LC layer 30 in accordance with requirements of an user. Furthermore, the LC molecule further includes the LC molecule having a formula (IV) below:

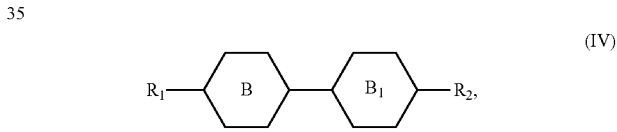

and in the formula (IV), B represents cyclohexane; $B_1$ represents cyclohexane or benzene; and $R_1$ and $R_2$ are respectively alkyl group of 1 to 8 carbon atoms, alkenyl group of 2 to 8 carbon atoms, or alkoxy group of 1 to 7 carbon atoms.

As above-mentioned, the LC molecule having the five-membered ring structure of the present invention is the five-membered ring structure which is introduced into an LC molecule through modification, so that the LC molecule has properties of the five-membered ring structure. Thereby, the rotational viscosity of the LC molecule within the LC panel is decreased to affect off-time thereof, and thus the problem of cross-talk effect produced from switching the 2D mode to the 3D mode in an LC display can be improved.

The above description of the invention is intended to be illustrative and not limiting. Various changes or modifications in the embodiments described may occur to those skilled in the art. These can be achieved without departing from the spirit or scope of the invention.

What is claimed is:

1. A mixture of liquid crystal (LC) molecules having a five-membered ring structure, for forming an LC layer of an LC panel, wherein the mixture comprises the LC molecules having the following formulas (I) and (II):

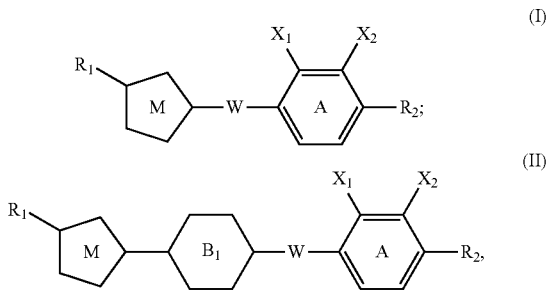

wherein A represents benzene; $B_1$ represents cyclohexane or benzene; M represents a five-membered ring structure; $R_1$ and $R_2$ are respectively alkyl group of 1 to 8 carbon atoms, alkenyl group of 2 to 8 carbon atoms, or alkoxy group of 1 to 7 carbon atoms; $X_1$ and $X_2$ are respectively a fluorine atom or a chlorine atom; and W represents one linking group selected from the group consisting of —$OCF_2$—, —$CF_2O$—, and —$CF_2CF_2$—.

2. The mixture of the LC molecules having the five-membered ring structure according to claim 1, wherein the LC layer further comprises liquid crystal reactive monomers (LC RMs) having a formula (III) below, the mixture of the LC molecules having the formulas (I) and (II) and the LC RMs having the formula (III) form an LC composition, and the LC RMs distribute the LC composition onto a polyimide surface of an alignment film:

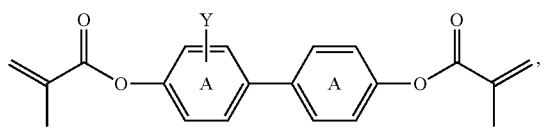

wherein A represents benzene; O represents an oxygen atom; and Y represents a hydrogen atom or a fluorine atom, wherein the mixture of the LC molecules having the formulas (I) and (II) has a weight ratio between 0.01% and 60% based on the total weight of the LC composition, and the remaining is the LC RMs having the formula (III).

3. The mixture of the LC molecules having the five-membered ring structure according to claim 1, further comprising the LC molecule having a formula (IV) below:

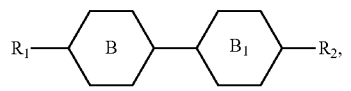

wherein B represents cyclohexane; $B_1$ represents cyclohexane or benzene; and $R_1$ and $R_2$ are respectively alkyl group of 1 to 8 carbon atoms, alkenyl group of 2 to 8 carbon atoms, or alkoxy group of 1 to 7 carbon atoms.

4. The mixture of the LC molecules having the five-membered ring structure according to claim 1, wherein the mixture of the LC molecules having the five-membered ring structure is applied to the LC panel having a two-dimensional mode and a three-dimensional mode.

5. An LC molecule having a five-membered ring structure, for forming an LC layer of an LC panel, wherein the LC molecule is shown as a formula (I):

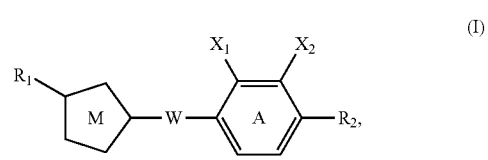

wherein A represents benzene; M represents a five-membered ring structure; $R_1$ and $R_2$ are respectively alkyl group of 1 to 8 carbon atoms, alkenyl group of 2 to 8 carbon atoms, or alkoxy group of 1 to 7 carbon atoms; $X_1$ and $X_2$ are respectively a fluorine atom or a chlorine atom; and W represents one linking group selected from the group consisting of —$OCF_2$—, —$CF_2O$—, and —$CF_2CF_2$—.

6. The LC molecule having the five-membered ring structure according to claim 5, wherein the LC layer further comprises liquid crystal reactive monomers (LC RMs) having a formula (III) below, the LC molecules having the formula (I) and the LC RMs having the formula (III) form an LC composition, and the LC RMs distribute the LC composition onto a polyimide surface of an alignment film:

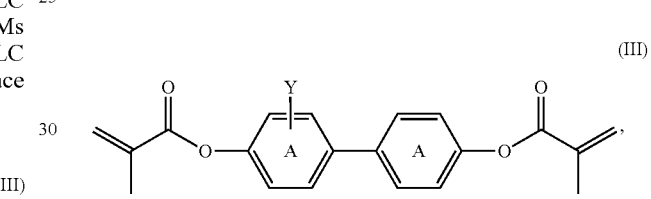

wherein A represents benzene; O represents an oxygen atom; and Y represents a hydrogen atom or a fluorine atom, wherein the LC molecule having the formula (I) has a weight ratio between 0.01% and 60% based on the total weight of the LC composition, and the remaining is the LC RMs having the formula (III).

7. The LC molecule having the five-membered ring structure according to claim 5, further comprising the LC molecule having a formula (IV) below:

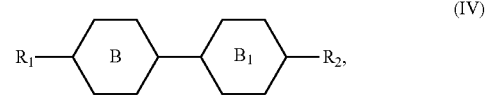

wherein B represents cyclohexane; $B_1$ represents cyclohexane or benzene; and $R_1$ and $R_2$ are respectively alkyl group of 1 to 8 carbon atoms, alkenyl group of 2 to 8 carbon atoms, or alkoxy group of 1 to 7 carbon atoms.

8. The LC molecule having the five-membered ring structure according to claim 5, wherein the LC molecule having the five-membered ring structure is applied to the LC panel having a two-dimensional mode and a three-dimensional mode.

9. An LC molecule having a five-membered ring structure, for forming an LC layer of an LC panel, wherein the LC molecule is shown as a formula (II):

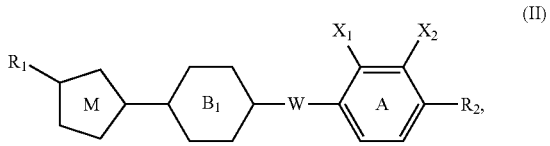

(II)

wherein A represents benzene; $B_1$ represents cyclohexane or benzene; M represents a five-membered ring structure; $R_1$ and $R_2$ are respectively alkyl group of 1 to 8 carbon atoms, alkenyl group of 2 to 8 carbon atoms, or alkoxy group of 1 to 7 carbon atoms; $X_1$ and $X_2$ are respectively a fluorine atom or a chlorine atom; and W represents one linking group selected from the group consisting of —$OCF_2$—, —$CF_2O$—, and —$CF_2CF_2$—.

10. The LC molecule having the five-membered ring structure according to claim 9, wherein the LC layer further comprises liquid crystal reactive monomers (LC RMs) having a formula (III) below, the LC molecules having the formula (II) and the LC RMs having the formula (III) form an LC composition, and the LC RMs distribute the LC composition onto a polyimide surface of an alignment film:

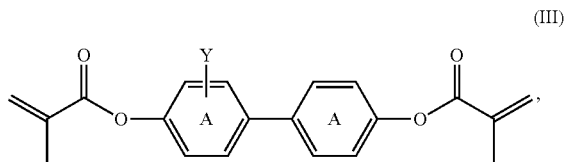

(III)

wherein A represents benzene; O represents an oxygen atom; and Y represents a hydrogen atom or a fluorine atom, wherein the LC molecule having the formula (II) has a weight ratio between 0.01% and 60% based on the total weight of the LC composition, and the remaining is the LC RMs having the formula (III).

11. The LC molecule having the five-membered ring structure according to claim 9, further comprising the LC molecule having a formula (IV) below:

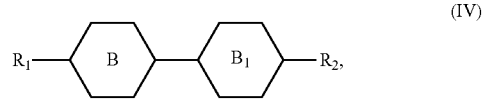

(IV)

wherein B represents cyclohexane; $B_1$ represents cyclohexane or benzene; and $R_1$ and $R_2$ are respectively alkyl group of 1 to 8 carbon atoms, alkenyl group of 2 to 8 carbon atoms, or alkoxy group of 1 to 7 carbon atoms.

12. The LC molecule having the five-membered ring structure according to claim 9, further comprising the LC molecule having a formula (IV) below:

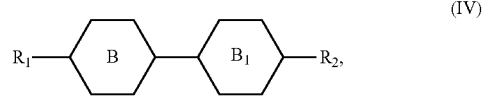

(IV)

wherein B represents cyclohexane; $B_1$ represents cyclohexane or benzene; and $R_1$ and $R_2$ are respectively alkyl group of 1 to 8 carbon atoms, alkenyl group of 2 to 8 carbon atoms, or alkoxy group of 1 to 7 carbon atoms.

13. The LC molecule having the five-membered ring structure according to claim 9, wherein the LC molecule having the five-membered ring structure is applied to the LC panel having a two-dimensional mode and a three-dimensional mode.

* * * * *

UNITED STATES PATENT AND TRADEMARK OFFICE
CERTIFICATE OF CORRECTION

| | | |
|---|---|---|
| PATENT NO. | : 9,034,203 B2 | Page 1 of 1 |
| APPLICATION NO. | : 13/640314 | |
| DATED | : May 19, 2015 | |
| INVENTOR(S) | : Chung-Ching Hsieh | |

It is certified that error appears in the above-identified patent and that said Letters Patent is hereby corrected as shown below:

Title Page, please add item (30) foreign application data as claimed by Applicant:
--June 19, 2012 (CN) 201210203332.0--.

Signed and Sealed this
Sixteenth Day of February, 2016

Michelle K. Lee
*Director of the United States Patent and Trademark Office*